July 15, 1958
K. A. BROWNE
2,843,056
COUPLER APPARATUS
Filed May 13, 1953
10 Sheets-Sheet 1
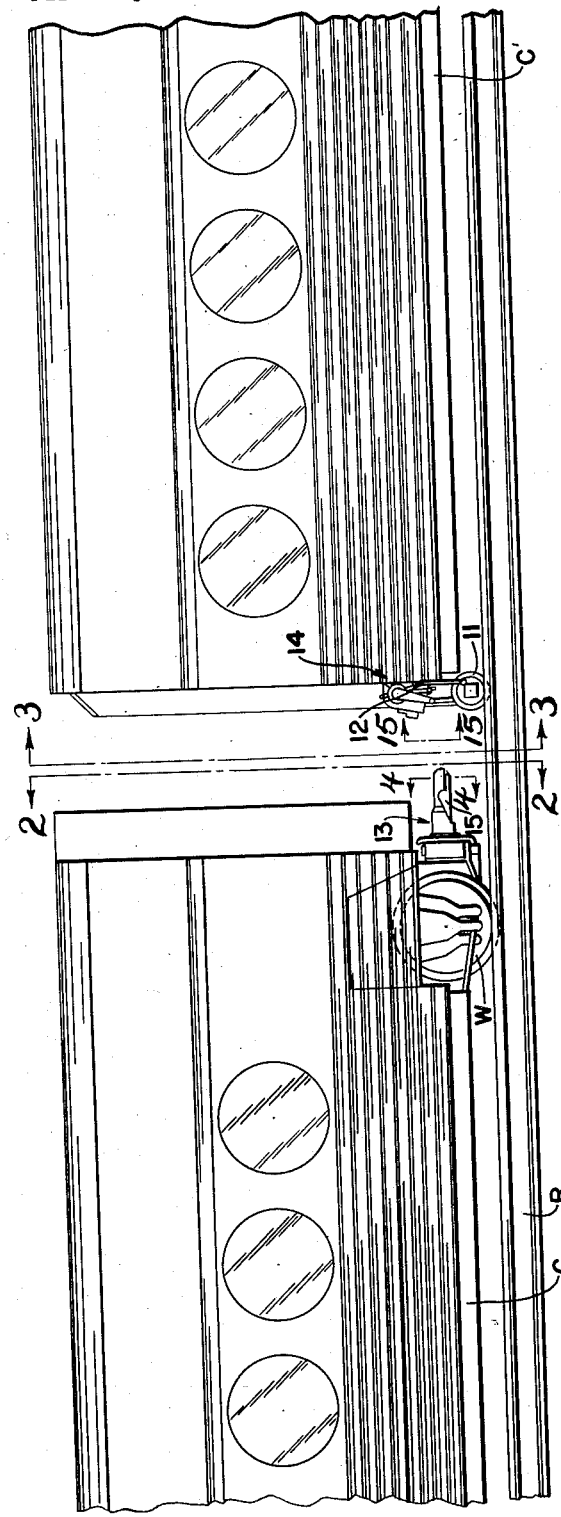
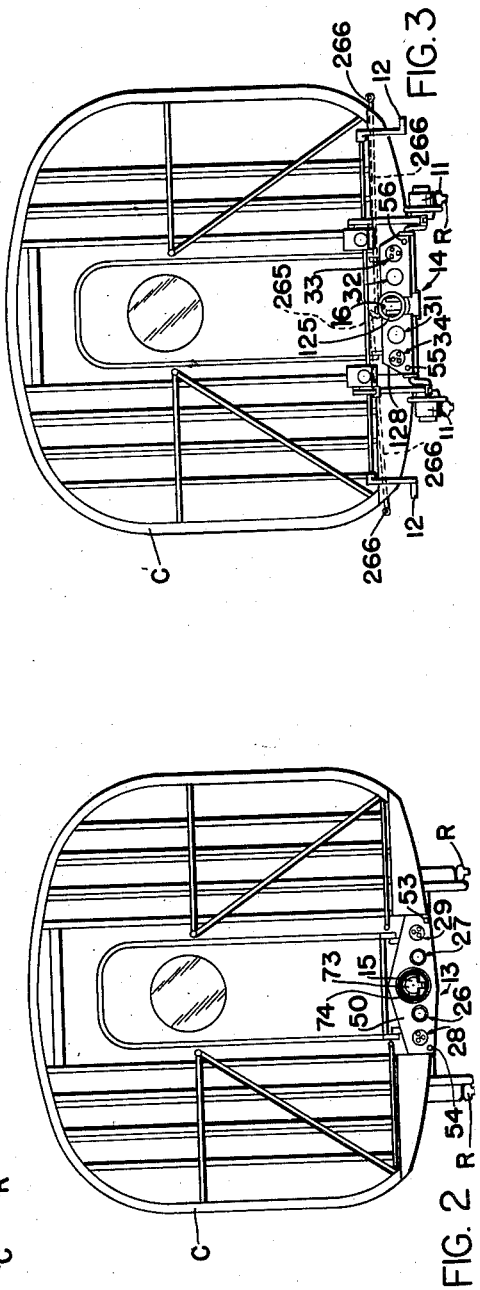
INVENTOR.
KENNETH A. BROWNE
BY Bosworth, Sessions, Herrstrom & Williams
ATTYS.

July 15, 1958 K. A. BROWNE 2,843,056
COUPLER APPARATUS
Filed May 13, 1953 10 Sheets-Sheet 2

INVENTOR.
KENNETH A. BROWNE
BY Bosworth Sessions,
Herrstrom & Williams
ATTYS.

INVENTOR.
KENNETH A. BROWNE
BY Bosworth, Sessions
Herrstrom & Williams
ATTYS.

July 15, 1958  K. A. BROWNE  2,843,056
COUPLER APPARATUS
Filed May 13, 1953 10 Sheets-Sheet 4

INVENTOR.
KENNETH A. BROWNE
BY Bosworth, Sessions
Herrstrom & Williams
ATTYS.

INVENTOR.
KENNETH A. BROWNE
BY
Bosworth, Sessions, Herrstrom
& Williams
ATTYS.

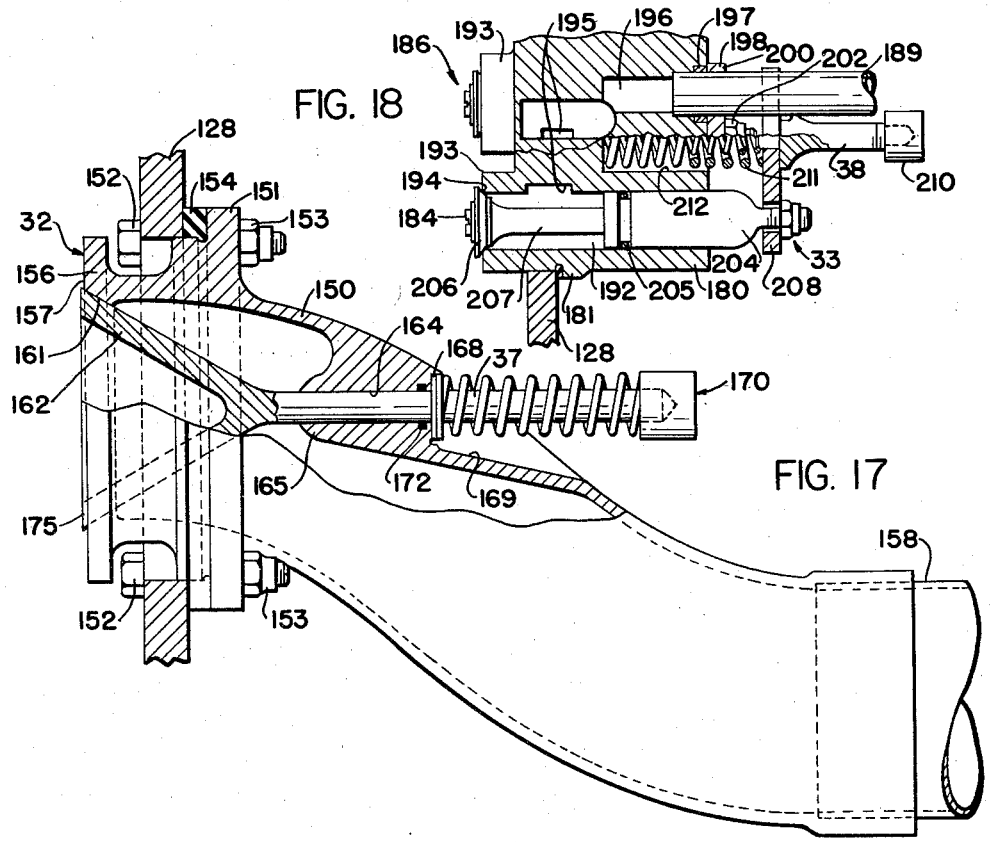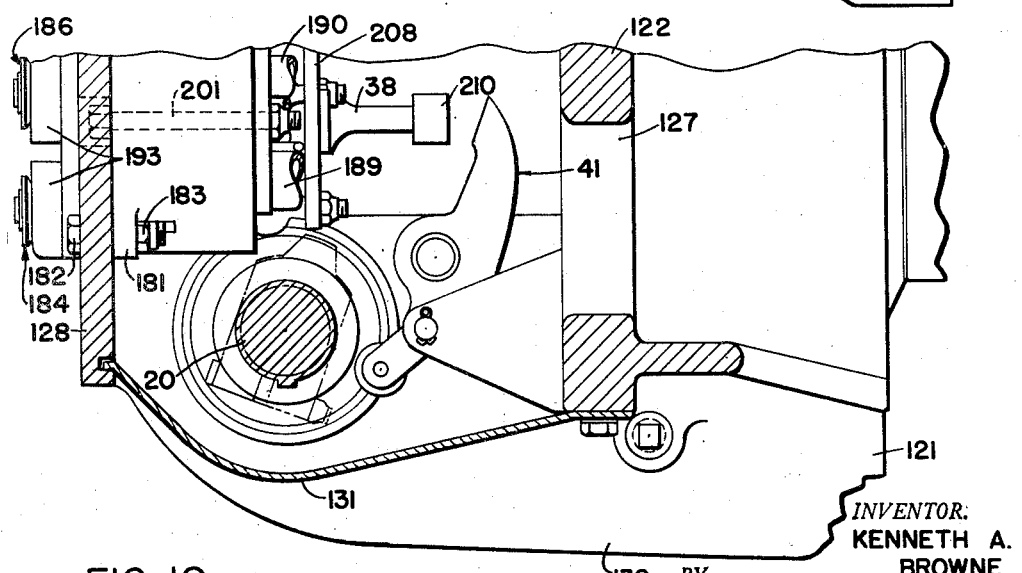

July 15, 1958

K. A. BROWNE 2,843,056

COUPLER APPARATUS

Filed May 13, 1953

*INVENTOR.*
KENNETH A. BROWNE

BY Bosworth, Sessions, Herrstrom & Williams

ATTYS.

July 15, 1958 K. A. BROWNE 2,843,056
COUPLER APPARATUS
Filed May 13, 1953 10 Sheets-Sheet 8

INVENTOR.
KENNETH
A. BROWNE
BY Bosworth, Sessions,
Kerstrom & Williams
ATTYS.

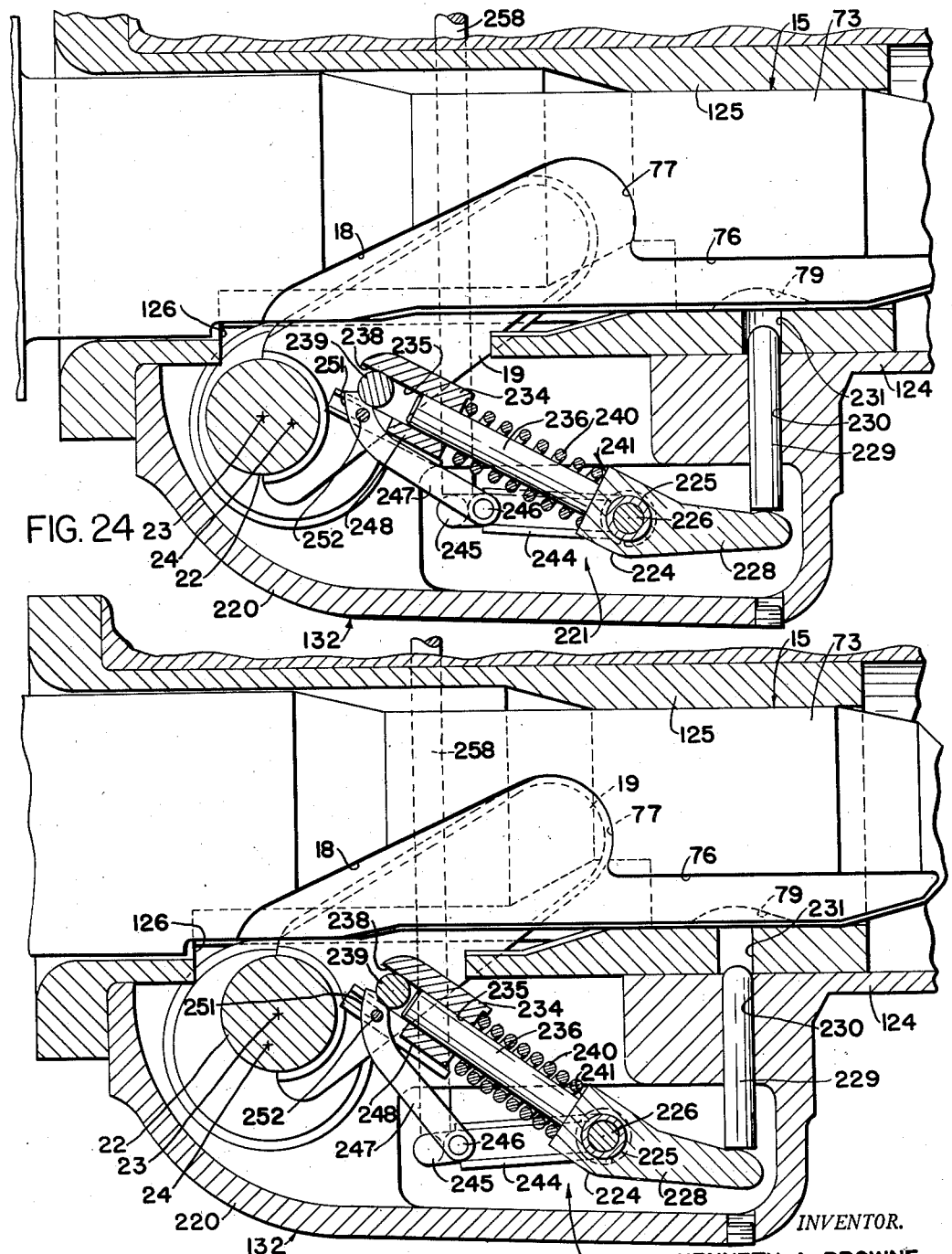

INVENTOR.
KENNETH A. BROWNE

United States Patent Office 2,843,056
Patented July 15, 1958

2,843,056

COUPLER APPARATUS

Kenneth A. Browne, Lakewood, Ohio, assignor to The Chesapeake and Ohio Railway Company, Cleveland, Ohio, a corporation of Virginia Application May 13, 1953, Serial No. 354,724

11 Claims. (Cl. 105—4)

This invention relates to railway trains embodying cars of the semi-trailer type in which the front ends of the cars are normally supported by the cars ahead, the rear ends of the cars preferably being supported by single axles. Trains of this type are advantageous from the standpoints of economy of construction and operation and safety at high operating speeds, but they require coupling apparatus different from conventional couplers.

The present invention, therefore, is directed to coupling apparatus particularly adapted for such trains.

In trains of this type, the couplers must not only furnish the tractive connection between the cars, but also provide vertical support for the front ends of the cars. Also, auxiliary supports such as retractable dolly wheels must be provided to support the front ends of uncoupled cars. Accordingly, a general object of the present invention is to provide a reliable and safe coupling apparatus for railway cars in which the cars coupled upon impact, by means of which the cars are connected together for tractive pull and one end of one car is supported by the other car, and which embodies auxiliary retractable supporting wheels interconnected with the coupling mechanism so that the cars cannot be uncoupled unless the wheels are down in position to support the uncoupled end of the car.

Other objects include the provision of a coupling apparatus in which the service lines of the cars are automatically connected when the cars are coupled together; the provision of a coupling with means for securely locking the cars together and simultaneous opening of the valves in the connected service lines thereby insuring against uncoupling of coupled cars while the service lines are open; the provision of a retractable support for one end of each car, the retraction and extension of the support being synchronized with the locking mechanism of the adjacent coupling so as to prevent uncoupling of the cars when the support is in the retracted position; the provision of rigidly mounted terminals for the service lines at the ends of each car and means for automatically drawing the terminals of corresponding service lines on adjacent cars into close fluid-tight engagement with each other when the cars are coupled together; the provision of a coupling with locking means which may be moved to and retained in unlocked position to permit uncoupling of the cars and which thereafter automatically resets so that the coupling is in position to be locked when the cars are brought together.

These and other objects of my invention will become apparent from the following description of a preferred embodiment thereof, reference being had to the accompanying drawings. In the description of the drawings as well as in the succeeding parts of the specification, reference to the forward coupler and rear coupler and parts thereof are intended to mean the portions of the coupling assembly which are located on the forward and the rear ends, respectively, of the cars which are coupled together. It will be appreciated that when the cars are coupled together, the forward coupler on the rear car is coupled to the rear coupler on the forward car.

Figure 1 is a fragmentary elevational view of two railway cars which include couplers embodying my invention and showing the cars uncoupled, but in position to be coupled.

Figure 2 is a rear end view of the front car taken along line 2—2 of Figure 1.

Figure 3 is a front end view of the rear car taken along the line 3—3 of Figure 1.

Figures 6, 10:
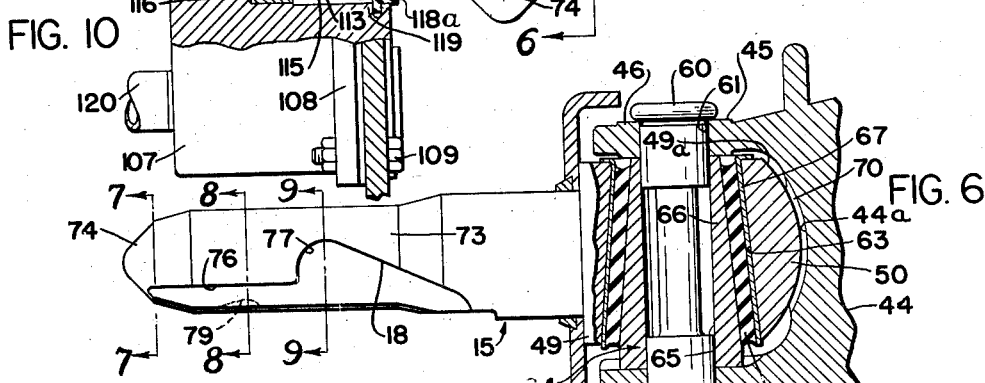
Figure 6 is a longitudinal section through the rear coupler taken along the line 6—6 of Figure 5.
Figure 7:
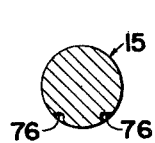
Figure 8:
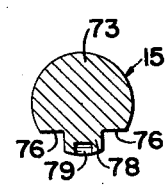
Figure 9:
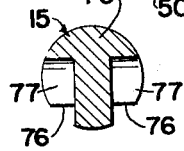

Figures 7, 8, and 9 are transverse sections of the coupling pin taken on the line 7—7, 8—8, and 9—9, respectively, of Figure 6.

Figure 5:
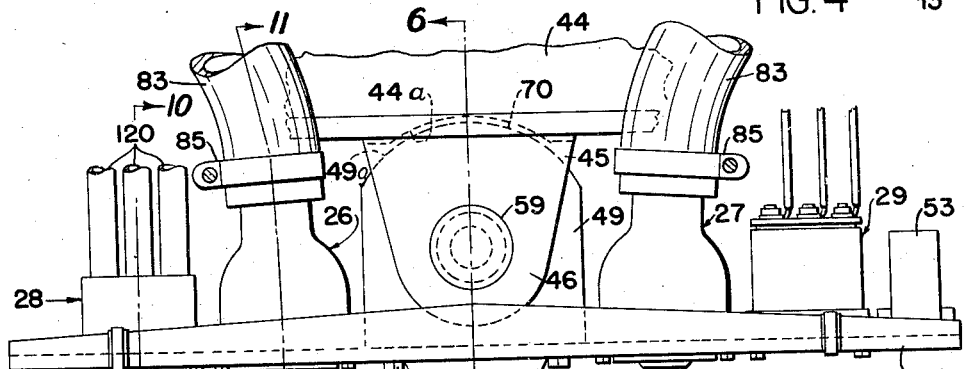
Figure 5 is a plan view of the rear coupler as viewed along the line 5—5 of Figure 4.

Figure 10 is an enlarged fragmentary vertical section taken along the line 10—10 of Figure 5 and showing the details of the air coupling of the rear coupler.

Figure 11:
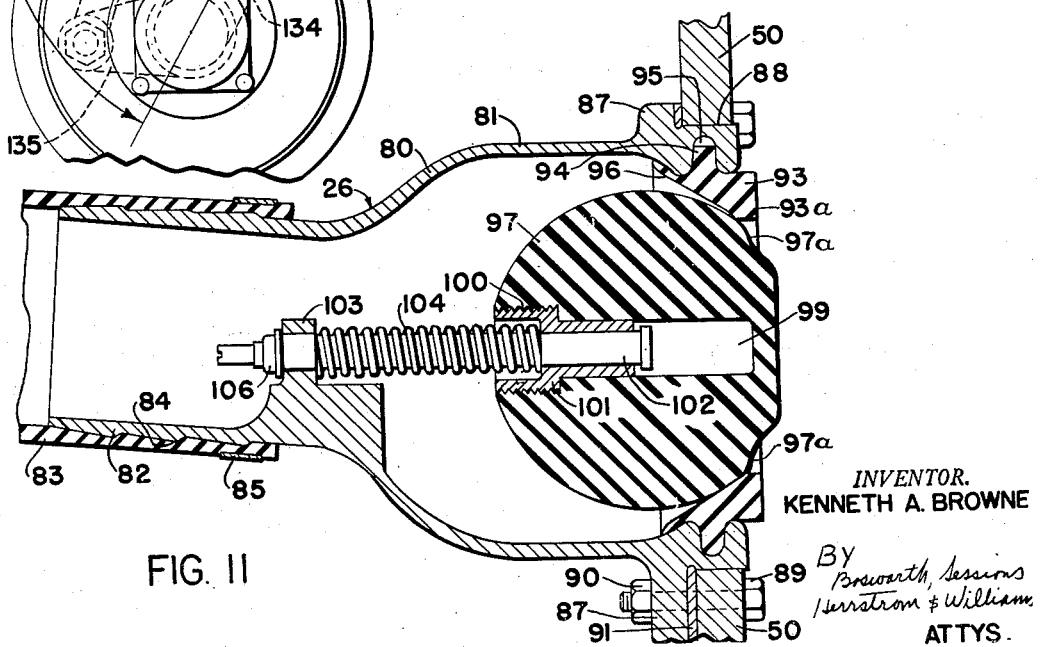

Figure 11 is an enlarged vertical section taken on the line 11—11 of Figure 5 and showing the details of construction of one of the fluid or water couplings of the rear coupler.

Figure 12:
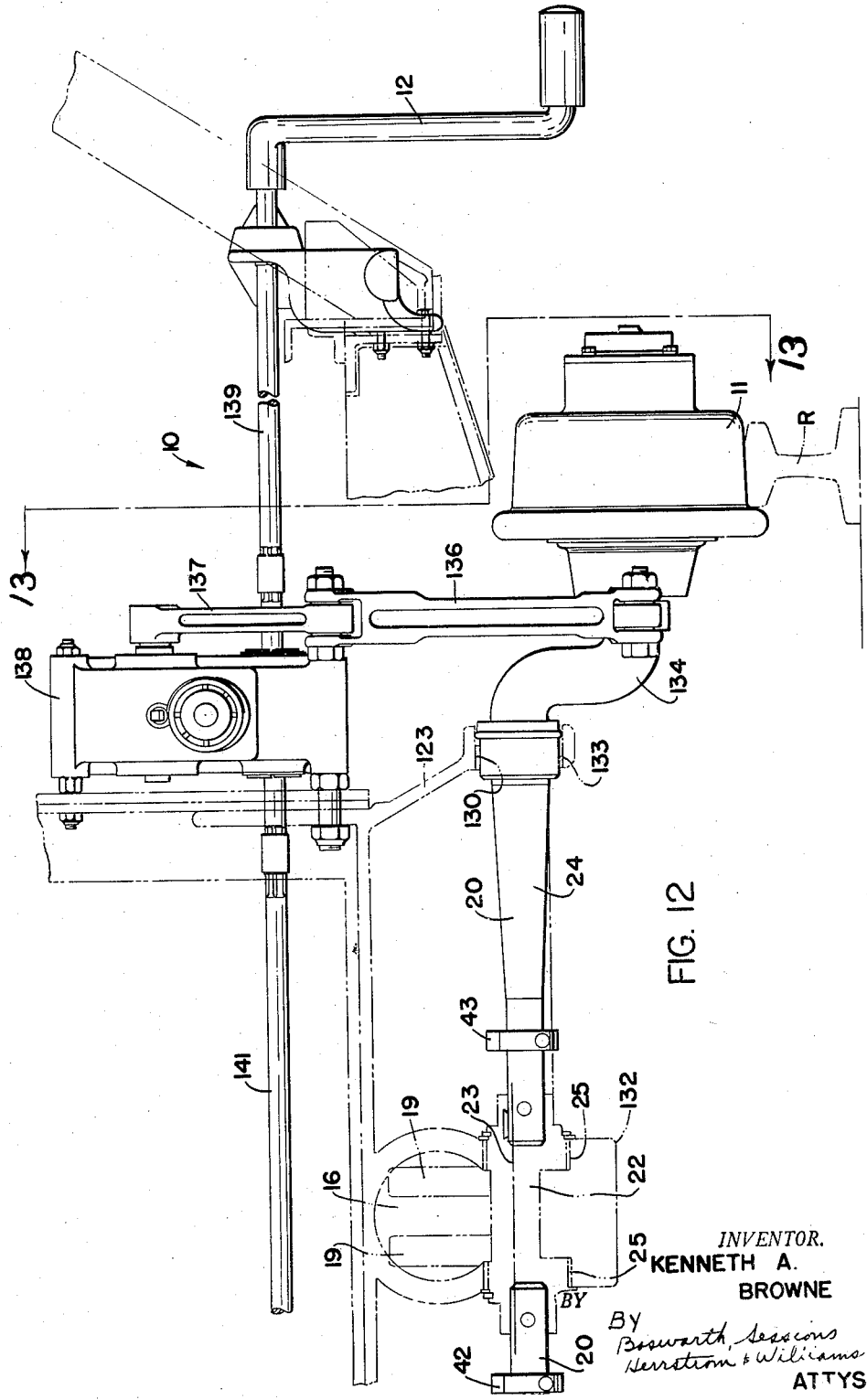

Figure 12 is a fragmentary elevation of the dolly wheel assembly for the rear car with portions of the car frame and forward coupler shown in phantom outline.

Figure 13:
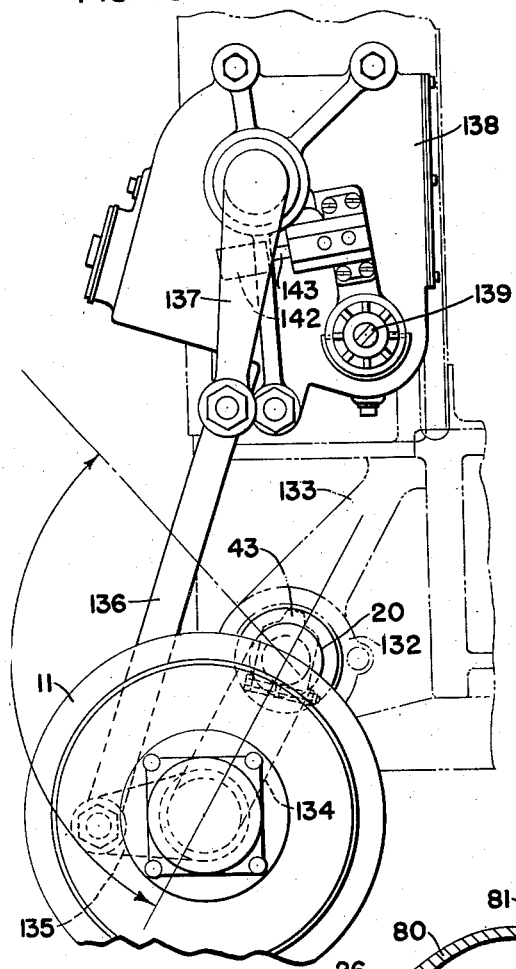

Figure 13 is a section taken along the line 13—13 of Figure 12 and showing the dolly wheels in the extended or car supporting position.

Figure 14:
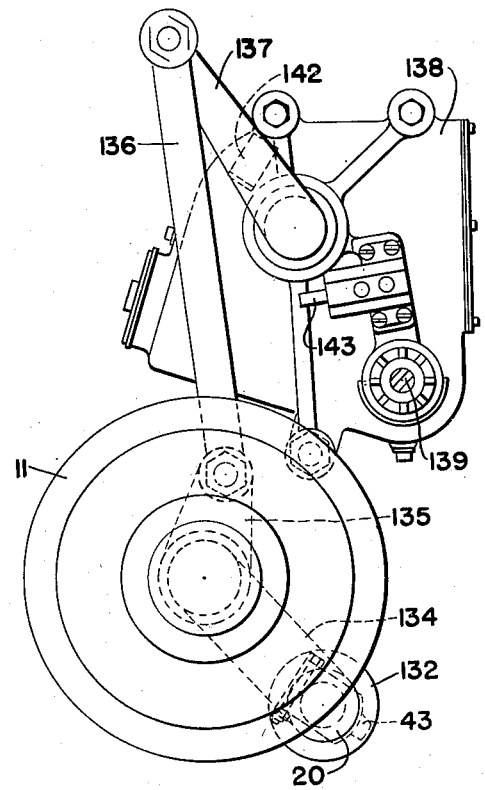

Figure 14 is a view similar to Figure 13 showing the dolly wheels in the retracted or idle position.

Figure 15:
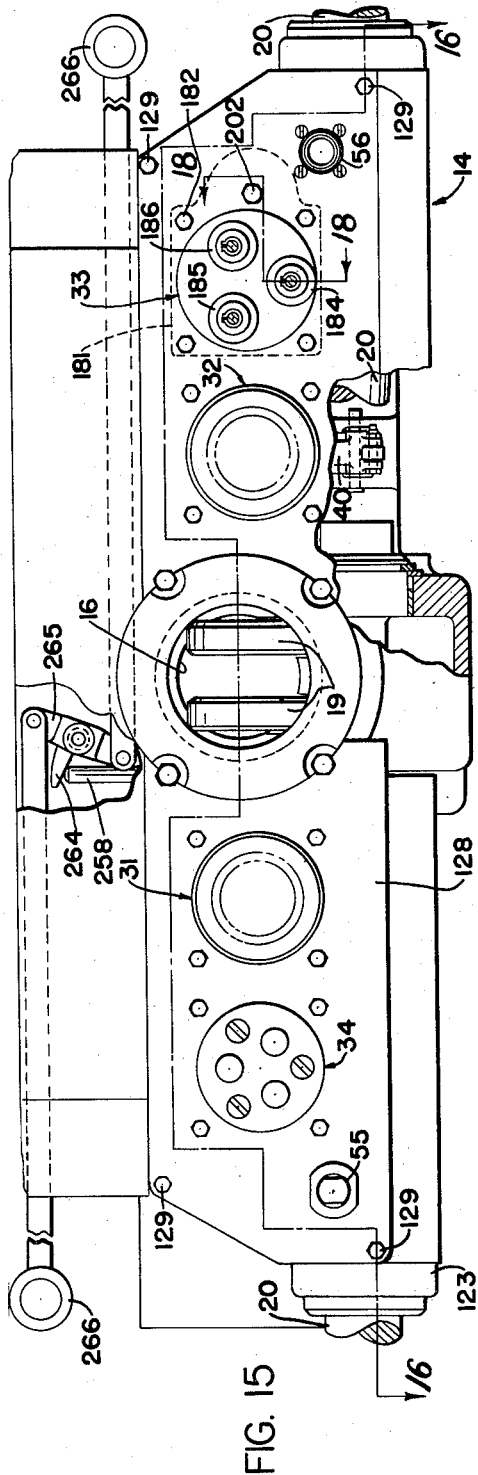

Figure 15 is an enlarged elevation of the forward coupler as viewed along the line 15—15 of Figure 1.

Figure 16:
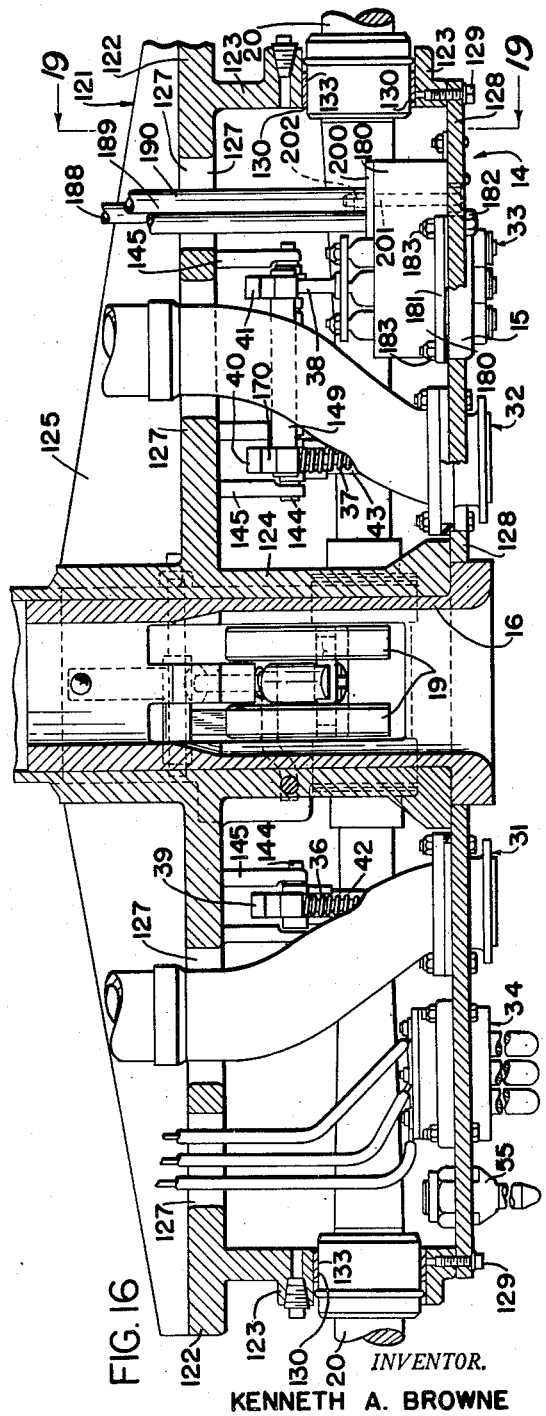

Figure 16 is a horizontal section taken along the line 16—16 of Figure 15.

Figure 17 is an enlarged view of a portion of Figure 16 partly in section and showing one of the water couplings for the forward coupler.

Figure 18 is an enlarged fragmentary sectional view of the air coupling for the forward coupler taken along the line 18—18 of Figure 15.

Figure 19 is an enlarged vertical section showing mechanism for actuating the valve in the air coupling of the forward coupler, the section being taken along the line 19—19 of Figure 16.

Figures 20, 21:
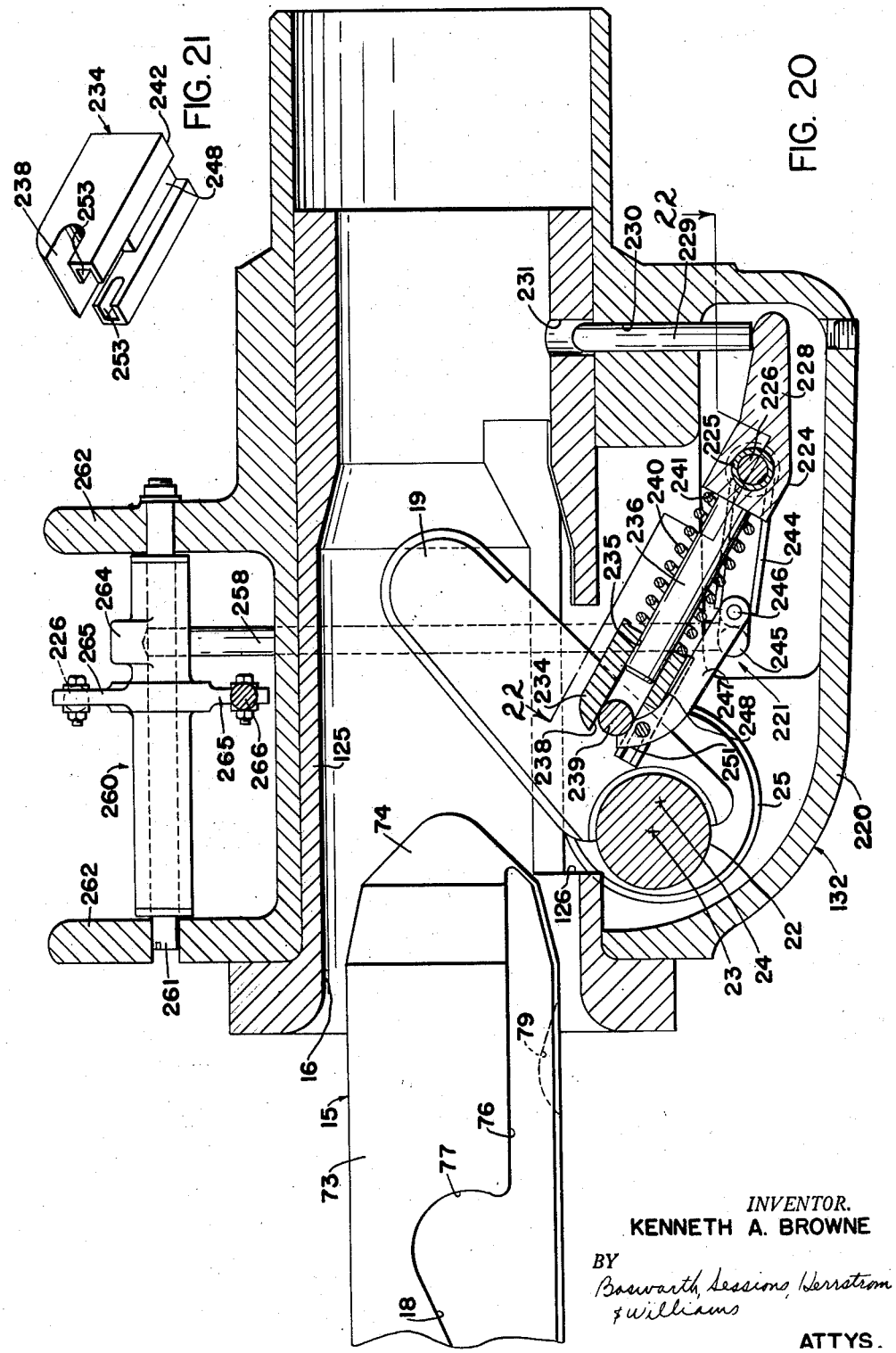

Figure 20 is an enlarged central vertical section through the coupling pin receiving socket in the forward coupler showing the coupling pin of the rear coupler partially inserted into the socket and prior to engagement of the pin with the locking members.

Figure 21 is a perspective view of the yoke part of coupling pin locking mechanism shown in Figure 20.

Figure 22:
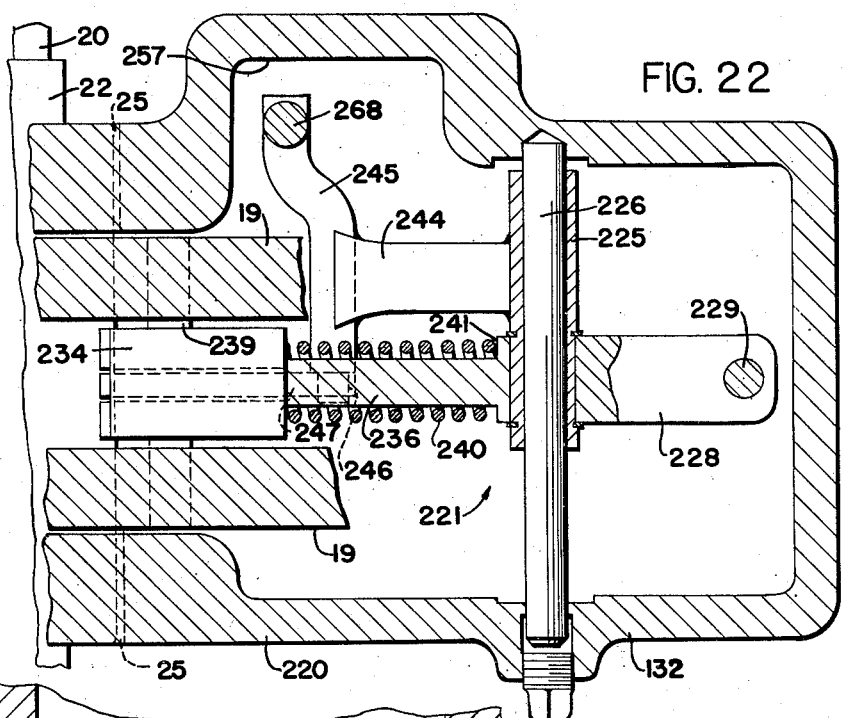

Figure 22 is a view partially in section of a portion of the coupling pin lock actuating mechanism as viewed along the line 22—22 of Figure 20.

Figure 23:
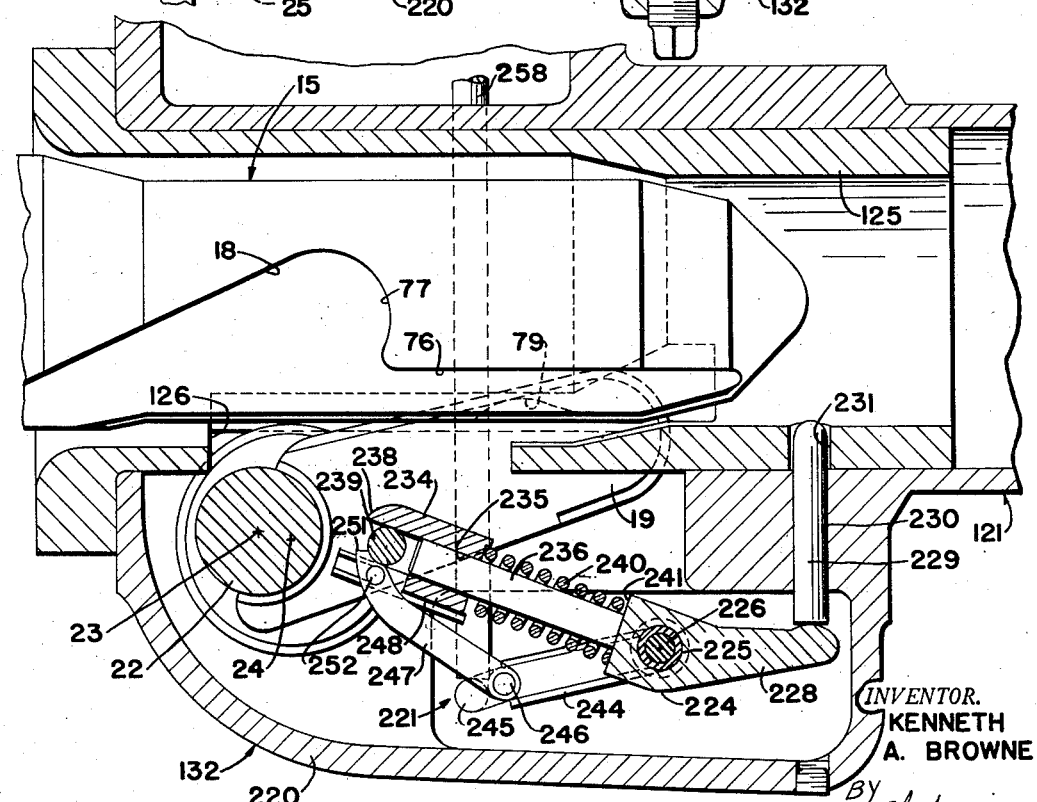

Figure 23 is a section similar to Figure 20 showing the coupling pin inserted more deeply into the socket and engaging and depressing the locking members of the coupling pin locking mechanism.

Figures 24 and 25 are sectional views similar to Figure 20 showing the positions of the locking mechanism when the coupling pin is partially locked and fully locked, respectively.

Figure 26:
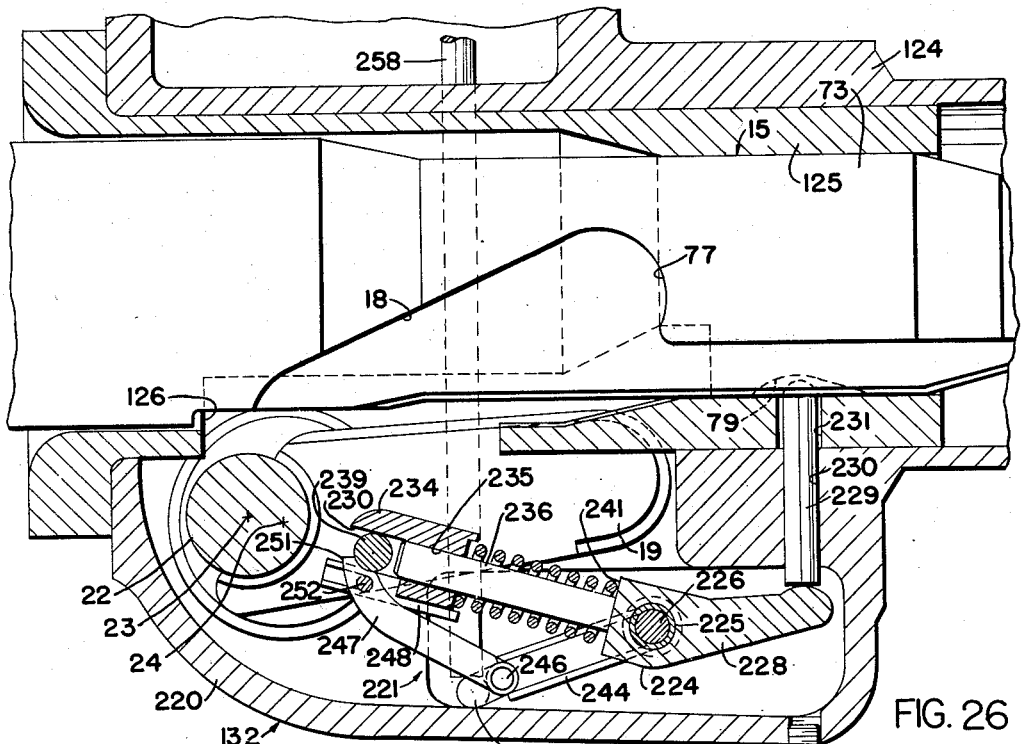

Figure 26 is a section similar to Figure 20 showing the coupling pin locking members fully depressed and disengaged from the coupling pin immediately prior to uncoupling the cars.

Figure 27:
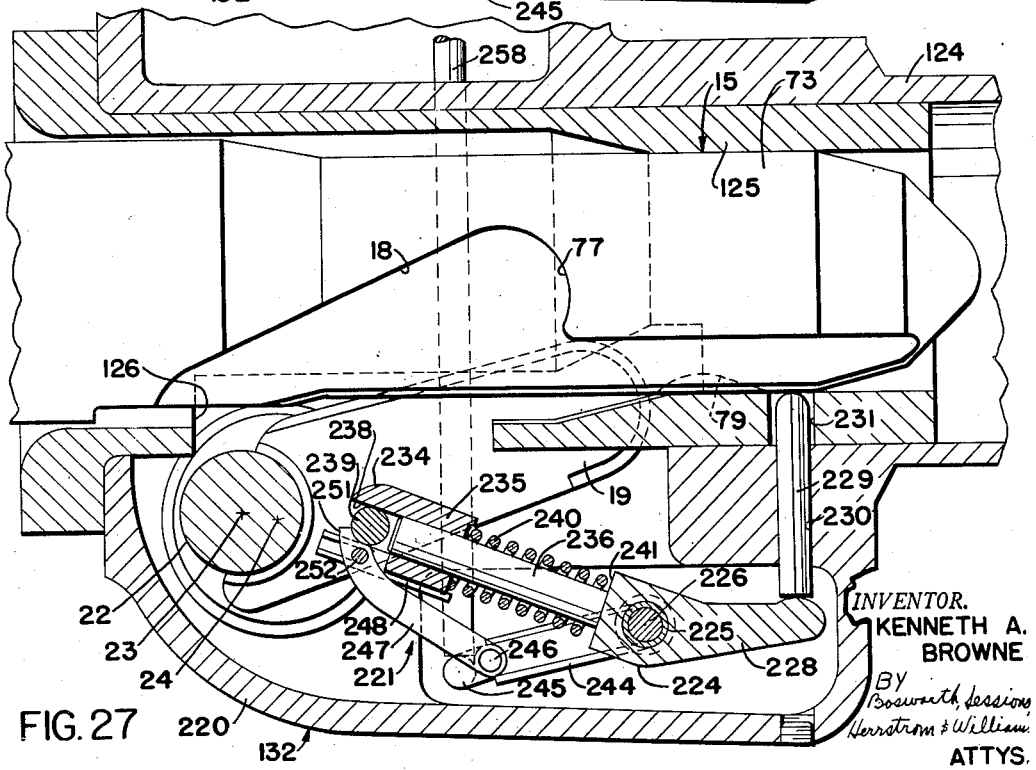

Figure 27 is a section similar to Figure 26 showing the coupling pin partially withdrawn from the socket during the uncoupling operation.

*General arrangement.*—A car coupling apparatus embodying my invention is illustrated in the drawings in conjunction with two railroad cars C and C', see Figure 1. The rear of car C is supported on rails R by wheels W journalled on an axle and located at the rear of the car; the rear of car C' (and also other cars in the train) is supported by similar wheels (not shown). The front of car C', when uncoupled from the adjacent forward car as shown in Figure 1 is supported on the rails R by a dolly wheel assembly 10 (Fig. 12) which comprises a pair of retractable dolly wheels 11. Similar dolly wheels (not shown) are provided for car C and the other cars in the train. When cars C and C' are coupled together, the dolly wheels 11 are retracted or swung upwardly from the rails by means of a crank 12 at the side of the car so that the front part of the rear car C' is supported by the forward car through the coupling assembly.

The coupling assembly for connecting cars C and C' and for making the intercar connections for air, water and electricity comprises a rear coupler 13, see Figures 1, 2, 4 and 5, mounted on the rear of car C and a forward coupler 14, see Figures 1, 3, 15 and 16, located on the front of car C'. The cars of a train each have a forward coupler and a rear coupler. Mechanical connection between the cars for both support and traction is made by a central rearwardly extending coupling pin 15, see Figure 6, which forms a part of the rear coupler 13 and is adapted to slide into and to be locked within a central socket 16 in the forward coupler 14, see Figures 15, 16 and 20, on car C'. Coupling pin 15 is formed with a pair of downwardly opening forwardly facing side slots 18; when the coupling pin is inserted into the socket 16, the slots 18 receive a pair of depressable locking members or pawls 19, which lock the coupling pin in the socket and connect the cars together.

In order to lock the coupling pin 15 securely within the socket 16 of the forward coupler when the dolly wheels are retracted, one or both of the dolly wheel axles 20, see Figure 12, is connected at its inner end to an eccentric 22, the axis 23 of which is offset from the axis 24 of axle 20. The locking members 19 project radially from and are pivotally connected to eccentric 22, see Figure 20. When the dolly wheels 11 are cranked upwardly after the pin 15 has been inserted within socket 16, rotation of the dolly wheel axle 20 rotates eccentric 22 about the axis 24 of axle 20, the eccentric being mounted in bearings 25 carried by car C, and causes pawls 19 to move longitudinally within the socket 16 and to forcibly engage the pin 15, thus securely and tightly locking the coupling pin within the socket 16, see Figures 24 and 25. Thus, coupling of the cars is not possible unless the dolly wheels have first been lowered to the car supporting position. When the dolly wheels are lowered prior to uncoupling, the reverse rotation of axle 20 causes the pawls 19 to shift or retract to a semi-locked position, see Figure 24, from which position the pawls may be depressed manually, as described in detail below, to a position below and out of engagement with the coupling pin 15, see Figure 26. The coupling pin 15 then, and only then, may be withdrawn from the socket 16 to uncouple the cars.

The rear coupler 13 and the forward coupler 14 also include service couplings providing for connection of water, air and electrical lines between the cars. In the preferred form of my invention, the service couplings which are located on the rear coupler 13, see Figures 4 and 5, include two substantially identical couplings 26 and 27 for water or other fluid, see also Figure 11, located on the opposite sides of coupling pin 15, an air coupling 28, see Figure 10, and an electrical receptacle 29. The corresponding and cooperating parts of these service couplings located on the forward coupler 14 comprise two fluid or water couplings 31, 32, see Figures 16 and 17, an air coupling 33, see Figure 18, and the electrical plug 34, see Figure 16.

In order to insure that the water and air lines will be closed at the couplings whenever the cars are uncoupled and will be opened only when the cars are fully coupled together, valves are provided in the water and air couplings to control the opening and closing of the respective service lines and mechanism is provided which closes the water and air valves in the forward and rear couplers whenever the dolly wheels are lowered or extended and which opens these valves only when the dolly wheels are retracted.

More specifically, the forward water couplings 31, 32 of the rear car C', see Figures 16 and 17, have spring loaded projecting plungers 36, 37, and the forward air coupling 33 has a corresponding plunger 38, see Figures 16 and 18, each plunger being connected to normally closed valves, described in detail below, in the respective water and air service lines in the forward coupler. Corresponding water and air valves, also described in detail below, in the rear coupler on the front car C are likewise normally closed. The plungers 36, 37 and 38 are adapted to be engaged and actuated by cranks 39, 40 and 41, respectively, see Figures 16 and 19, which in turn are adapted to be rocked by cams 42 and 43 secured on and rotatable with dolly wheel axles 20, see also Figure 12. When the dolly wheels 11 are cranked down into the lowered or extended position, as in Figure 13, cams 42 and 43 are rotated so as to be out of engagement with cranks 39, 40 and 41 and hence the plungers 36, 37 and 38, under the pressure of springs, are fully extended rearwardly and the respective valves to which the plungers are connected as well as the service valves in the rear coupler are closed. As the dolly wheels are cranked upwardly to the retracted position, see Figure 14, dolly wheel axles 20, 21' rotate sufficiently to cause cams 42 and 43 to engage and rock the cranks 39, 40 and 41, respectively, which in turn depress the respective plungers 36, 37 and 38 and open the valves in both the forward and rear water and air couplings. Connection of the inter-car electric line may be effected simply by plugging plug 34 on the forward coupler into receptacle 29 on the rear coupler as the cars are brought together. When the cars are separated, the circuit is broken by separation of these parts. If preferred, a switch which is responsive to movement of the dolly wheel axles in the same way as are the air and water valves and which is operative to open and close the electric circuit when the dolly wheels are up and down, respectively, may be provided.

Figure 4:
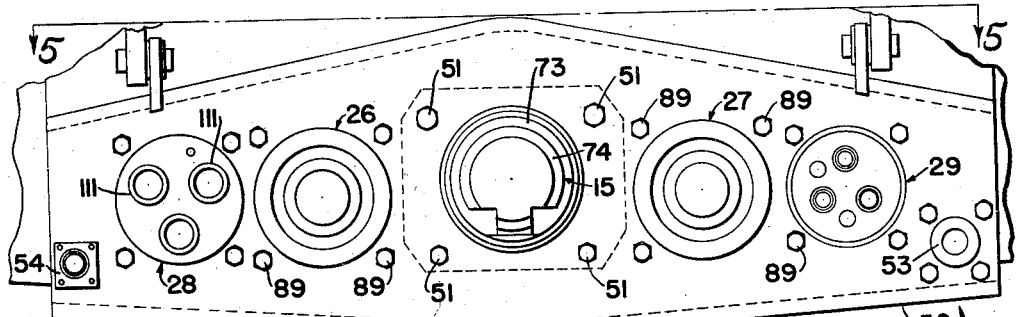
Figure 4 is an enlarged elevation of the rear coupler as viewed along the line 4—4 of Figure 1.

*Rear coupler.*—The portion of the coupling assembly which is located on the rear end of each car and referred to herein as the rear coupler 13, see Figures 4, 5 and 6, comprises a main coupler casting 44 which extends forwardly and acts as the end sill of underframe of the car C. Casting 44 projects rearwardly beyond the end of the car C and terminates in a yoke 45 having vertically spaced upper and lower flanges 46 and 47 between which the hinge portion 49 of the coupling 15 is pivotally supported. A laterally extending channel shaped plate 50 is secured by bolts 51 to the rear face of the hinge portion 49 of coupling pin 15 and constitutes a mounting plate to which the rear water and air couplings 26, 27 and 28 as well as the electric receptacle 29 are secured in suitable apertures. Plate 50 also has a socket member 53 and a projecting guide member 54 which are adapted to telescope with a guide pin 55 and socket 56, respectively, located on the forward mounting plate 128, see Figures 15 and 16, to insure alignment of the plates and the coupler components during the coupling operation and when the cars are coupled together.

In order to support the coupling pin 15 for limited pivotal movement on the yoke 45 of the rear coupler casting 44, a vertically disposed hinge pin 59 is provided. As shown in Figure 6, pin 59 has a head 60 at its upper end and extends downwardly through closely fitting apertures 61, 62 in the flanges 46 and 47, respectively. The hinge portion 49 of the coupling pin is preferably formed with a tapered hole 63 which fits the exterior surface of a frusto-conical shock absorbing bushing 64 having a cylindrical opening 65 through which the hinge pin 59 extends. The bushing 64 preferably comprises a metal inner sleeve 66, a metal outer sleeve 67 having an annular top flange 68 engageable with the marginal edges of the coupling pin mounting hole 63, and a sleeve 69 of rubber or rubber-like material disposed between and bonded to the inner and outer sleeves 66 and 67, respectively. The inner sleeve 66 preferably is keyed or otherwise secured at its lower end to the bottom flange 47 of the yoke 45 and pivoting of the coupling pin 15 about the axis of hinge pin 60 subjects the rubber sleeve 66 to torsional stresses; this action of the bushing 64 tends to keep pin 15 in line with the car axis to facilitate coupling of the cars. The forward end 49a of the hinge portion 49 and the adjacent surface 45a of the yoke 45 are spherically shaped and have a clearance space 70 as shown to permit pivoting of the coupling pin 15 about the hinge pin 60, and to a limited extent at right angles thereto without interference; the clearance 70, however, permitting only limited compressive motion of the rubber 69 under heavy buff loads.

The rearwardly extending part 73 of coupling pin 15 preferably is substantially cylindrical and has a bullet shaped nose 74 to facilitate entry of this part of the coupling pin into the coupling pin receiving socket 16 in the forward coupler 14 of the rear car C'.

As shown in Figures 6, 9, 10 and 11, the rear underside portion of the projecting part 73 of the coupling pin is recessed to provide a pair of longitudinally extending shoulders 76 disposed symmetrically with respect to the axis of the pin and extending from the rear end of the pin 15 forwardly to the concave end portions 77 at the rear ends of slots 18. The shoulders 76 of the coupling pin engage and depress locking members 19 in the main coupling socket 16 of the forward coupler 14 when the cars are being coupled together; the locking members 19 ultimately swinging rapidly upwardly into the slots 18 of the coupling pin as the shoulders 76 pass over and release the locking members 19 during the advance of the coupling pin 15 into the socket 16. The web 78 intermediate the shoulders 76 preferably has a central recess 79 for resetting the locking members 19 during the uncoupling operation as will appear more fully below.

The rear water couplings 26 and 27, see Figures 5 and 11, preferably are disposed on opposite sides of the coupling pin and are substantially identical in construction and mode of operation. Each coupling preferably comprises a hollow housing 80 with an enlarged or bulbous rear portion 81 and a forward part 82 of reduced diameter to which a flexible hose 83 is connected. The outer surface of the forward part 82 of the housing 80 is preferably serrated as indicated at 84 to prevent accidental displacement of the hose 83 therefrom. A hose clamp 85 is used to secure the connection. The enlarged portion 81 of the housing 80 has an annular external mounting flange 87 and a cylindrical surface 88 which extends rearwardly from the flange 87 and projects through an aperture in the mounting plate 50. Bolts 89, extending through the plate 50 and flange 87, and nuts 90 on the opposite side of flange 87 fasten the housing 80 to the plate 50. The washer or gasket 91 is disposed between flange 87 and the back side of plate 50.

The valve mechanism for each of the water couplings 26 and 27 comprises a rubber or rubber-like annular seat member 93 located at the rear end of the enlarged portion 81 of the housing and having an annular external flange 94 engaged in an annular groove 95 in the housing wall to hold the seat member in place. The inner surface 96 of the seat member is conical and the valve is closed by a valve head 97 which has a generally spherical surface adapted to engage the seat 93. In order to support the valve head 97 for longitudinal movement toward and away from valve seat 93 to open and close the valve, valve head 97 has an opening 99 therein; the open forward end of the recess is threaded as at 100 to receive a bushing 101 which receives a guide pin 102 that extends through the bushing 101 forwardly of the valve head 97 and through an apertured lug 103 on the interior of housing 80. The guide pin is secured in place by a lock nut 105 on the end 106 thereof. In order to urge valve head 97 rearwardly into engagement with the conical seat 96 of the member 93 and thus to close the valve, a compression spring 104 is disposed on the guide pin, the spring acting between the bushing 101 and the lug 103. With this arrangement the spring 104 and the water pressure act to close the valve unless a force is applied to the head 97 to unseat it and the valves of the rear water couplings are thus automatically closed whenever the cars are uncoupled. When the cars are coupled and the dolly wheel raised, valve head 97 is unseated by forward movement of valve head 162 of forward water coupling 32 (see Figure 17), face 175 of valve head 162 engaging exposed face 97a of rear valve head 97.

The rear air coupling 28, see Figure 10, comprises a substantially cylindrical housing 107 extending through the mounting aperture in the plate 50 and having an annular mounting flange 108 lying against the back side of the plate 50, the rear face of the housing being exposed on the opposite side of plate 50. Mounting flange 108 has suitable apertures for receiving securing bolts 109 which secure the housing 107 to the plate 50.

In order to provide for the usual air lines the housing 107 preferably has three longitudinally extending passageways 111, see Figure 4; since these passageways and their associated valves are substantially identical only one is described herein. The valve mechanism in each of the passageways constitutes a check valve and includes a valve head 112 disposed to move longitudinally within the passageway 111. The valve head is supported by a valve stem 113 extending forwardly therefrom and slidably mounted in a spider 114; a spring 115 concentrically mounted on the stem acting to urge the valve head rearwardly away from the spider to a closed position. The spider 114 fits tightly in passageway 111 and is of usual construction, having arms 116 supporting a hub 117 which is bored to receive valve stem 113. In order to close the passageway 111, valve head 112 engages a resilient annular seat member 118, which is secured at the rear end of the passageway by an integral flange 119 which fits into a corresponding groove in the housing wall, the rear face 118a of the seat member projecting slightly beyond the face of the housing as shown in the drawings in order to seal against the forward air coupling 33 when the cars are coupled.

The opposite or forward end of the passageway 111 is threaded to receive the threaded end of a rigid conduit 120 which constitutes an air line for the front car C. Whenever the cars are uncoupled, air pressure in passageway 111 forces valve head 112 against valve seat 118 to close the passageway. The passageway is opened when valve head 112 is displaced from the seat 118 to the position indicated in dotted lines in Figure 10 by the movable valve head 206 of the forward air valve assembly 33, see Figure 18. As described in detail below, this occurs when the cars are coupled and the dolly wheels are down.

*Forward coupling.*—As shown in Figures 15 and 16, the forward coupler 14 comprises a main casting 121 acting as the end sill of the underframe of the car C' and having a transverse wall 122, side walls 123, a central longitudinally extending hollow body portion 124 and a reinforcing web 125 extending between wall 122 and the central body portion. The body portion 124 receives and supports the coupling pin socket 16 which is in the form of a sleeve having an opening 126, see Figure 20, along its bottom side through which the locking members 19 extend. The transverse wall 122 has a plurality of openings 127 through which the air, water and electrical lines extend. The forward wall of the coupler is constituted by a mounting plate 128 secured at its ends by bolts 129 to side walls 123. Mounting plate 128 corresponds to and makes engagement with mounting plate 50 of the rear coupler and is formed with openings through which the housings of the forward water, air and electrical couplings and the coupling pin socket 16 extend. The side walls 123 of the main casting 121 have openings 130, through which dolly wheel axles 20 extend. The underside of the casting preferably is enclosed by a bottom cover 131, see Figure 19, secured to the lower portions of walls 122 and 123 and mounting plate 128. The casting 121 also includes a housing 132, see Figures 20 and 22, for the coupling pin locking mechanism and for supporting the inboard ends of the axles 20.

The mechanism for raising the dolly wheels 11 when the cars are coupled and for lowering them preparatory to uncoupling is shown in Figures 12, 13 and 14. The dolly wheels are journalled on the outboard ends of the axles 20. Since the components of the dolly wheel mechanism located on either side of the center line of the car are substantially the same, only the mechanism in one side is described herein and like reference characters indicate like parts of the dolly wheel assembly located on opposite sides of the car.

The inboard end of axle 20 is supported on and keyed to the eccentric 22 which in turn is journalled for rotation in bearings 25, see also Figure 20, in the housing portion 132 of the forward coupler casting 121 located directly under the coupling pin socket 16. The intermediate portion of axle 20 is supported in a bearing 133 mounted in the aperture 130 in side wall 123 of casting 121. The portion 134 of the axle 20 which projects beyond the intermediate bearing 133 is bent or otherwise formed to the shape of a crank as shown, the wheel 11 being mounted by means of suitable bearings on the outboard end of this portion of the axle. Thus the axis of the wheel 11 is offset from the axis 24 of the axle 20 and rotation of the axle 20 about its axis therefore raises or lowers the dolly wheel 11.

Raising and lowering of the dolly wheels is accomplished by means of a link 136 pivotally connected at one end to bracket 135 secured to the crank portion 134 of the axle 20 and at the opposite end to an arm 137 extending from a gear box 138, which contains appropriate reduction gearing whereby the arm can be swung to raise and lower the wheels as shown in Figures 13 and 14. Operation of the gear box and arm is preferably by means of a shaft 139 which extends from the gear box to the side of the car where the crank handle 12 is removably connected to the shaft. A lug 142, see Figures 13 and 14, secured to the arm 137 of the gear box is adapted to engage a stop 143 on the gear box housing to limit downward rotation of the arm 137 and to define the proper position of the dolly wheels in the extended position, see Figure 13; in this position, the toggle constituted by links 136 and 137 is over center as shown, hence the dolly wheels cannot be displaced by the load upon them. The dolly wheel assembly in the retracted or idle position is shown in Figure 14. The gear boxes 138 associated with each of the dolly wheels are connected together by an intermediate shaft 141 which permits operation of both gear boxes simultaneously from either side of the car. If desired, power means may be used instead of the manually operated mechanism shown to raise and lower the dolly wheels.

In order to provide for automatic connection of the train water, air and electric lines when the cars are coupled together, the forward water couplings 31 and 32, the forward air coupling 33 and the electric plug connectors 34 are all mounted on the front face of mounting plate 128. The forward water couplings 31 and 32 are substantially identical, accordingly only coupling 32 is described in detail. As shown particularly in Figures 16 and 17, coupling 32 preferably comprises a conduit or casing 150 made of cast bronze and curved laterally and upwardly in order to clear the parts of the assembly to the rear of the plate 128. The casing is supported on the mounting plate 128 by means of an integral mounting flange 151 and bolts 152 and nuts 153, a thermal insulating gasket 154 being interposed between the flange 151 and rear face of plate 128. The forward end of the casing projects beyond plate 128 and terminates in a flange 156 having a flat end face 157 adapted to engage the projecting face 93a of the rear water coupling valve seat member 93, see Figure 11, and make a leakproof connection between these parts when the cars are coupled together. The casing is connected to the water line 158 of the car by means of soldering, brazing or other suitable joint.

In order to provide for closing the passageway through housing 150 when the cars are uncoupled, the forward end of the housing 150 is formed with a conical valve seat 161, against which the conical valve head 162 seats. If desired, an O-ring or other suitable packing can be employed at the mating surfaces of valve head and seat to create a better seal. Valve head 162 is supported on valve stem or plunger 37 which is slidably mounted in opening 164 in the inwardly projecting lug or boss 165. Valve stem 37 extends rearwardly through opening 164, the curve of the housing 150 permitting the stem to project behind the housing. The valve is constantly urged toward closed position by a spring 167 disposed on the projecting part of the valve stem. The spring acts between a washer 168 in recess 169 and a cap 170 secured to the end of the stem. An O-ring 172 disposed between washer 168 and the housing 150 prevents leakage along the stem 37.

Valve head 162 preferably is conical as shown thereby preventing leakage of water and the projecting end surface 175 thereof engages the adjacent end surface 97a of valve 97 in the rear water coupling, see Figure 11, when the cars are coupled together. As noted above, when the dolly wheels are raised, crank 40, see Figure 16, actuated by cam 43 on dolly wheel axle 20 rocks and engages cap 170 and urges valve stem 37 and valve head 162 forwardly, thus unseating valve heads 162 and 97, opening both valves and permitting passage of water from one car to the other through the coupling. When the dolly wheels are lowered, crank 40 rocks in the opposite direction and springs 104 and 167 return the valve heads 97 and 162, respectively, into engagement with the respective seats 94 and 161 thereby closing the passageways in both the forward and rear water couplings.

The forward air coupler 32 comprises a casing 180, see Figures 15, 16 and 18, secured to the mounting plate 128 by mounting flange 181, bolts 182 and nuts 183. In order to co-act with the rear air coupling 28, the housing 180 is formed with three substantially identical air valve mechanisms 184, 185 and 186, arranged to open and close three separate passageways which extend through the housing. Three conduits 188, 189 and 190 communicating with these passageways, respectively, are connected to the rear end of the housing and are laterally offset from the valve mechanisms 184, 185 and 186, see Figure 16, so as not to interfere with actuation of the valve mechanisms. The three valve mechanisms are substantially identical in construction and like reference characters indicate like parts on the drawings.

Referring now to Figure 18, the valve mechanism 184 comprises a chamber 192 which extends the full depth of the housing 180 and is open at both ends. The forward end of the chamber 192 terminates in an external boss 193 which projects from the face of the housing and whose internal edge is bevelled to form a valve seat 194. As shown in the drawings, the chambers 192 of valve mechanisms 184 and 185 are connected by transverse channels 195 to separate laterally offset chambers, one of which is shown at 196, which open only at the rear of the housing and to which the respective rear conduits are connected. Thus, the chamber 192 in each of the valve mechanisms 184, 185 and 186 is connected by an independent transverse channel 195 to an offset chamber 196 which communicates with one of the conduits 188, 189, 190; chamber 192, channel 195 and chamber 196 in each instance constituting a passageway from each valve seat 194 to the rear conduit. Chamber 196 preferably is counter-bored as indicated at 197 to receive a packing ring 198 which surrounds the conduit 189 and seals the connection of the conduit to housing 180. The three conduits 188, 189 and 190 extend through and preferably are welded to a transverse plate 200 secured by a longitudinally extending bolt 201 and a nut 202 (Figure 16) tightly against the back of the housing 180.

The air valve mechanism disposed in each chamber 192 comprises a piston 204 provided with a seal 205, a valve head 206 engageably with the bevelled seat 194, and an intermediate stem 207 connecting the piston 204 and valve head 206. Piston 204 projects rearwardly beyond housing 180 and is connected to a transverse pressure plate 208 which is also connected to corresponding parts of the other two valve mechanisms 185 and 186. Plunger 38 is connected to the opposite or rear side of plate 208 and extends rearwardly thereof terminating in a cap 210. Spring 211 disposed in a rearwardly opening recess 212 in housing 180 bears against the pressure plate 208, urges it rearwardly from the housing 180 thereby urging valve head 206 toward the valve seat 194 to close the valve; it will be understood that the valves associated with valve mechanisms 185 and 186 are also urged in closing direction by spring 211.

The diameter of the front face of valve head 206 is slightly less than the internal diameter of the rear air valve seat member 118, see Figure 10, so that when the cars are coupled together the valve head 206 can engage the face of floating valve head 112. Similarly, the diameter of each boss 193 on the forward air valve housing 180 is substantially equal to the diameter of each rear air valve seat member 118 and engages and seals against the latter when the cars are coupled together. When the dolly wheels are cranked up during the coupling operation, valve head 206 moves forwardly in response to the actuation of crank 41, see Figure 19, and is unseated from valve seat 194. At the same time, movement of valve head 206 displaces rear air valve head 112 from seat 118 thereby opening the passageways to the flow of air between the cars. When the dolly wheels are cranked down, spring 211 acting against pressure plate 208 moves piston 204 rearwardly and returns valve head 206 to its seat. Inasmuch as piston 204 and valve head 206 are of substantially the same area, the effects of air pressure within chamber 192 on the valve and piston are balanced. As explained above, air pressure in passageway 111 and spring 115 closes the rear air valve 112.

*Locking mechanism.*—The mechanism for locking the coupling pin 15 within the socket 16 (Figures 20, 21 and 22) includes, as noted above, locking members or pawls 19 and the eccentric 22. These parts, together with the toggle assembly indicated generally at 221, are disposed in the housing portion 220 of the forward coupler casting 132. The toggle assembly controls the angular position of the pawls 19 relative to the axis of the coupling pin 15 and thus controls the locking action of these pawls. The toggle assembly comprises a rocker 224 pivotally mounted on a bushing 225, in turn pivotally mounted on a transverse pin 226 carried by the housing 132. The rearwardly extending arm 228 of rocker 224 is engaged by the lower end of a toggle return pin 229 which extends upwardly through apertures 230 and 231 in the main casting 121 and the coupling pin socket sleeve 125, respectively. When the coupling pin 15 is fully inserted into the socket 16 (and the pawls 19 are fully depressed as shown in Figure 26) toggle return pin 229 projects above the inner surface of the sleeve 125 and is vertically aligned with the recess 79 in the bottom of coupling pin 15.

In order to connect the rocker to the pawls 19, a yoke member 234, see also Figure 21, having a central bore 235 is slideably mounted on the forward arm 236 of the rocker 224. The forward end of the yoke 234 is formed with a transverse slot 238 which receives a transversely extending pin 239 connected at its opposite ends to the pawls 19. A compression spring 240 on arm 236 and acting between shoulder 241 of the rocker and the rear end 242 of the yoke holds the yoke in engagement with the pin 239. Thus, by means of the yoke, rocker 224 is connected to the pawls 19 so that rocking movement of the rocker about the pin 226 results in rotational movement of the pawls 19 about the axis 23 of the eccentric and vice-versa. Accordingly, as the pawls 19 are rotated in a clockwise direction from the position shown in Figure 20, the rocker is rotated in a counterclockwise direction.

The toggle assemble 221 (see Figure 22) also includes a toggle crank 245 formed by rigid joining as by welding to an arm 244, which is rigidly secured to the bushing 225. The inner end 246 of the crank 245 extends through an aperture in a toggle link 247 disposed under rocker arm 236 in alignment with the bottom slot 248 in yoke member 234. The end 251 of toggle link 247 opposite the pivotal connection to toggle crank 245 extends into the bottom slot 248 of the yoke 234 and is pivotally connected to the yoke by a transverse pin 252. The ends of pin 252 are disposed in longitudinally extending recesses 253 formed on opposite sides of groove 238 and which extend a limited distance from the front face of the yoke member 234. Pin 252 engages the bottom of the recess 253 and provides an operable connection between toggle mechanism and the rocker by means of which the pawls 19 may be moved out of engagement with the coupling pin 15 starting as shown in Figure 24 and moving to position as shown in Figure 26. The initial downward motion of toggle crank 245 acts with considerable mechanical advantage to compress spring 240. The outer end 251 of toggle link 247 extends into the transverse slot 238 of the yoke and is concave as shown at 255 to conform to a portion of the periphery of pin 239, acting as a stop to prevent pawls 19 from carrying pin 239 out of the yoke slot 238 when the pawls are quickly returned to the upright position shown in Figure 20 by the action of compression spring 240 when the coupling pin 15 is withdrawn from socket 16.

In order to provide for manual disengagement of pawls 19 from the coupling pin 15, the end of toggle crank 245 opposite its connection to toggle link 247 extends into a recess 257, see Figure 22, in the lower part of the housing 220 in vertical alignment with a release pin 258 which extends upwardly to a point above the top of the coupling pin receiving socket 16, see Figure 20. The extreme upper end of release pin 258 preferably engages a crank arm 260, see also Figure 15, which is pivotally supported on a shaft 261 journalled at its ends in vertical flanges 262 on the central part of the forward coupler casting 121. Crank arm 260 is rotated or rocked so as to push on the top end of toggle release pin 258 by means of actuating arms 265 rotatable with arm 260 and extending radially in opposite directions from the axis of shaft 261. The arms 265 are connected at their outer respective ends to horizontal rods 266 which extend transversely of and to opposite sides of the car, see Figure 3, where the hooked ends of the rods 266 are accessible to the trainmen. A pull on either rod 266 causes arms 265 to rotate about the axis of shaft 261, rocking arm 264 downwardly and pushing toggle release pin 258 against toggle crank 245, thereby depressing pawls 19 to the position shown in Figure 26 where the center of the pin 239 is about on a line connecting axis 23 of the eccentric and the center of rocker pin or shaft 226. In this "dead center" position, friction on eccentric 22 from spring 240 and the weight of pawls 19 holds the pawls in their lower or depressed position so that the coupling pin 15 can be withdrawn. With the parts in this position, toggle return pin 229 projects upwardly into the recess 79 in pin 15, but as the coupling pin is withdrawn from the socket 16, and after the rear walls 77 of grooves 18 have moved beyond the ends of pawls 19, the return pin 229 is engaged by the surface of pin 15, depressing rocker 224 and raising arm 236 and pawls 19 to the position shown in Figure 27. Thus, the toggle mechanism is released by the action of toggle return pin 229 rocking the rocker assembly 221 when the coupling pin 15 is withdrawn from socket 16. Thereafter, when the coupling pin is removed from the socket, spring 240 acting through yoke 234 moves the pawls to the position shown in Figure 20, where they are in position for a coupling operation.

*Summary of operation.*—With the cars uncoupled as shown in Figure 1, the rear car C' is supported at its forward end on the dolly wheels 11. The coupling pin 15 normally is aligned with the axis of car C and is in substantial alignment with the axis of coupling pin receiving socket 16 of the rear car. Accordingly, when the cars are moved together the coupling pin 15 enters the socket 16 as shown in Figure 20. The coupling pin locking pawls 19, prior to engagement by coupling pin 15, normally extend upwardly at an angle of about 60° into the socket 16 and into the path of the coupling pin 15 as it enters the socket; the pawls 19 being supported in this position by the pressure of coil spring 240 against yoke 234.

As the coupling pin 15 moves farther into the socket 16, the top surfaces of locking pawls 19 are engaged by the downwardly facing shoulders 76 on the bottom of the coupling pin thus rotating the locking pawls downwardly about the axis 23 of eccentric 22, against the action of spring 240 to position shown in Figure 23. Spring 240 urges the locking pawls upwardly against the shoulders 76 and as the coupling pin 15 continues to advance into the socket 16, the locking pawls clear the shoulder 76 and are quickly rotated upwardly by the spring 240 into the slots 18 in the coupling pin 15 as shown in Figure 24.

With the pawls 19 so disposed in the slots 18 of the coupling pin 15, there is substantial play between the locking members and the coupling pin, the cars nevertheless being loosely coupled together since the pawls prevent withdrawl of the pin from the socket 16. At this stage of the coupling operation, guide members 53 and 54 are in engagement with guide members 55 and 56 so that the mounting plates 50 and 128 and the forward and rear water and air couplings and electrical couplings 28 and 34 are aligned with and in initial engagement with each other, the air and water valves still remaining closed. The cars are now in proper relative position for retraction of the dolly wheels 11 and transfer of the load of the front end of the rear car C' to the forward car C.

In the illustrated embodiment of my invention, the dolly wheels 11 are cranked up by means of a crank 142 which removably engages the worm operating shaft 141 extending inwardly from either side of the rear car C'. The effect of cranking up the dolly wheels 11 in addition to transferring the weight of the front end of the rear car to the forward car is to lock tightly the coupling pin 15 in the socket 16 and to actuate mechanism to open the valves in the forward and rear air and water couplings.

The locking of the coupling pin 15 in the socket 16 is accomplished through the action of eccentric 22 which is keyed to the dolly wheel axles 20 so that as the dolly wheels are cranked up, the eccentric rotates from the position shown in Figure 24 to the fully locked position shown in Figure 25, thereby moving the pawls 19 rearwardly into tight engagement with the back portions 77 of coupling pin slots and solidly locking the coupling pin 15 in socket 16. In addition, the pressure of the locking members 19 against coupling pin 15 draws the mating surfaces of the forward and rear water and air couplings into fluid tight engagement with one another and completes the connection of the electrical couplings. Rotation of dolly wheel axles 20 during upward cranking of the dolly wheels 11 also moves cams 42, 43, see Figures 13, 16 and 19, until these cams engage the respective cranks 39, 40 and 41 and cause the cranks to engage and move plungers 36, 37 and 38 of the forward water and air valve assemblies thereby opening the water and air valves in both the forward and rear couplers. This completes the coupling operation.

When the cars C and C' are to be uncoupled, dolly wheels 11 are first cranked downwardly to the extended position shown in Figure 13 where they support the front end of the rear car and take the load off of the coupling pin 15. The downward cranking of the dolly wheels 11 also permits the air and water valves to close under the action of their respective self-contained springs and returns the locking pawls 19 to the position shown in Figure 23. Next the pawls are manually rotated or depressed by means of the crank assembly 260, see Figure 20, to the position shown in Figure 26 out of engagement with the slots 18 in the locking pin 15 so that the latter may be withdrawn from the socket 16. The trainman actuates the crank assembly 260 by pulling on one of the actuating rods 266, see Figure 3, which rotates the crank assembly about the axis of pin 261, causing toggle release pin 258 to be depressed, and thereby rotating rocker 224 counterclockwise and locking pawls 19 clockwise about the axis 23 of eccentric 22. In this position the toggle mechanism is on "dead-center" so that the pawls 19 remain in the position shown in Figure 26 until the coupling pin 15 is withdrawn sufficiently from socket 16 to prevent pawls 19 from engaging in coupling pin slots 18. Then as the withdrawal of the coupling pin 15 from the socket 16 continues, the toggle return pin 229 is forced downwardly by engagement with the tapered back portion of coupling pin recess 79. The bottom end of pin 229 engages rocker arm 228 which is depressed, thereby pivoting the rocker sufficiently to move the toggle mechanism out of its "dead-center" position. Pawls 19 then swing upwardly as shown in Figure 27 but engage shoulders 76 instead of slots 18 of the coupling pin 15. Accordingly, the coupling pin may be completely withdrawn from the socket 16, the pawls returning to their initial position shown in Figure 20, ready for another coupling operation, as soon as uncoupling is complete.

It is intended that the patent shall cover by suitable expression in the appended claims whatever features of patentable novelty reside in the invention.

I claim:

1. In a train having railway cars each of which has relatively fixed wheels at the rear end and an extensible and retractible support at the forward end, the improvement of car coupling apparatus comprising a rear coupler mounted on the rear end of a lead car and a corresponding forward coupler mounted on the forward end of the adjacent trailing car coupled to the lead car, said rear coupler comprising a rearwardly extending central coupling pin pivotally secured to the car frame, a rear transverse mounting plate secured to said pin at a point spaced from the free end of the pin, fluid couplings carried on said plate and normally closed valves in said fluid couplings, said forward coupler comprising a forward transverse mounting plate and a socket in which said coupling pin is disposed, forward fluid couplings carried by said forward mounting plate, normally closed valves in said forward fluid couplings, a pawl carried by said forward coupler engaging and locking said coupling pin in said socket, said forward and rear mounting plates being juxtaposed to each other with the forward and rear fluid couplings being aligned and in engagement with each other, and means associated with said forward coupler and operatively connected to said support and responsive to retraction and extension of said support for simultaneously locking and unlocking said coupling pin and opening and closing said valves, respectively.

2. In a train having railway cars each of which has a pair of relatively fixed wheels at one end and extensible and retractible dolly wheels at the other end, and means for raising said dolly wheels to an inoperative position when the cars are coupled together and for lowering said dolly wheels to an operative car-supporting position when the cars are uncoupled, the improvement of coupling apparatus comprising a central coupling pin pivotally secured to said one end of a first car and projecting longitudinally therefrom, fluid lines on said first car terminating adjacent said coupling pin, valve means normally closing the termini of said fluid lines, the adjacent end of a second car having a socket into which said coupling pin extends, said second car having fluid lines terminating adjacent said socket, valve means normally closing the termini of the fluid lines of said second car, locking members on the second car engaging and locking said coupling pin in said socket, the termini of the fluid lines on said first and second cars, respectively, being aligned and in engagement, means responsive to retraction and extension of said dolly wheels for actuating said locking members to tightly lock said coupling pin within said socket when said dolly wheels are retracted and to partially release said coupling pin when said dolly wheels are fully extended, and means responsive to said movements of the dolly wheels to open said valve means in said fluid lines when the dolly wheels are retracted and to close said valve means when the dolly wheels are fully extended.

3. Apparatus for coupling two railway cars in a train, one of said cars having extensible and retractible dolly wheels adjacent the coupled ends of the car, means for elevating and for lowering said dolly wheels, said apparatus comprising a coupler on the one end of a first car and a corresponding coupler on the adjacent end of a second car coupled to the first car, means associated with said couplers for tractively coupling said cars together, said first and second cars having respectively aligned fluid lines terminating at said couplers, valve means normally closing the termini of the lines of said cars, and means responsive to retraction and extension of said dolly wheels for opening the valve means in the fluid lines of both cars when the dolly wheels are retracted and for closing said valve means when the dolly wheels are fully extended.

4. Coupling apparatus for railway cars and the like, comprising a rear coupling plate mounted on the rear end of a first car and a forward coupling plate carried on the forward end of a second car with which said first car is coupled, an extensible and retractible support on the coupled end of one of said cars, said cars each having a fluid line terminating at and secured to one of said coupling plates, valve means normally closing the termini of said fluid lines of said first and second cars, coupling means for mechanically coupling said cars together, said forward and rear coupling plates when said cars are coupled together being juxtaposed to each other with the ends of the fluid line on the first car aligned with and engaging the end of the corresponding fluid line on the second car, and means responsive to the extension and retraction of said support for locking and unlocking said coupling means and for simultaneously opening and closing the valve means in the fluid lines of said coupled cars to control the flow of fluid between said first and second cars.

5. Coupling mechanism for railway cars, each car being supported at one end on a pair of relatively fixed wheels and having a pair of retractible dolly wheels at the other end, and means for raising and for lowering said dolly wheels, the mechanism comprising a coupling pin pivotally secured to an end of a first car, a socket in the adjacent end of a second car and in which said coupling pin is disposed, said coupling pin supporting the weight of the adjacent end of the second car with the dolly wheels on the second car raised, a locking member on the second car and projecting into said socket and engaging said coupling pin, and means responsive to the upward and downward movements of said dolly wheels for actuating said locking member to lock said coupling pin within said socket when the dolly wheels are raised and to release said locking members when said dolly wheels are lowered.

6. Coupling mechanism for railway cars and the like comprising a coupling pin pivotally connected to and projecting from one end of a first car, a second car coupled to said first car having a socket formed in the end thereof adjacent said one end of the first car in which said coupling pin is disposed, said coupling pin having a downwardly opening recess formed therein, means for locking said coupling pin in the socket of said second car comprising at least one locking member on said second car projecting upwardly through the bottom of and into said socket and arranged to pivot in a vertical plane about an axis into and out of said socket, said member engaging in the recess of said pin when said pin is inserted in said socket whereby to lock the pin therewith, a rocker pivotally mounted below said socket and operatively connected to said member whereby pivotal movement of said rocker means causes corresponding pivotal movement of said member, resilient means on said rocker for urging said member upwardly, means to rock said rocker in one direction whereby to rotate said member to a depressed position out of engagement with said coupling pin, means to hold said member in said depressed position, and means actuatable by movement of said coupling pin out of said socket to rock said rocker means in the opposite direction and to rotate said member upwardly and reset same.

7. In combination, coupling apparatus for railway cars, each car having relatively fixed supporting wheels at one end and retractible supporting means at the other end, a coupling pin secured to and projecting from one end of each car, the opposite end of each car having a socket with a horizontal axis in which the coupling pin on the adjacent car is disposed, means for locking the coupling pin of one car in the socket of the adjacent car, means for retracting said retractible means on each car near the proximate rear end of the adjacent car whereby the load of the forward end of each coupled car is supported on the rear end of the adjacent car through said coupling pin, and means operatively connected to said retracting means for synchronizing the locking of said coupling pin in said socket with the retraction of said retractible means whereby the coupling between adjacent cars is locked when the retractible means proximate thereto is retracted.

8. Coupling apparatus for railway cars, each car having relatively fixed supporting wheels at one end and retractible and extendable supporting means at the other, comprising a coupling pin secured to and projecting from an end of each car, the projecting portion of said coupling pin having a shoulder, the opposite end of each car having a longitudinally extending socket in which the coupling pin on the adjacent car is disposed, at least one locking member supported on each car adjacent the socket therein and projecting into said socket, said locking member engaging said shoulder on the pin and blocking withdrawal of said pin from the socket, means for retracting said retractible means on each car, means for shifting said locking member longitudinally within said socket between positions of loose and tight engagement with the shoulder of the inserted pin in response to the retracting and extending movements of said supporting means, and means to disengage the locking member from said shoulder when said member and shoulder are loosely engaged in order to permit withdrawal of said pin from said socket during uncoupling operations.

9. The apparatus of claim 8 with an eccentric mounted for rotation under said socket, said locking member being supported on said eccentric and being movable longitudinally in response to rotation of said eccentric, said supporting means comprising dolly wheels having axle means, said axle means being rotatable during retracting and extending movements of said dolly wheels, said eccentric being connected to and rotatable with said axle means.

10. Coupling apparatus for railway cars, comprising a coupling pin pivotally connected to and projecting from one end of one car, said projecting portion of said pin having a shoulder, a socket formed in the adjacent end of the other car in which said coupling pin is disposed, service lines on each car for carrying fluid and having terminals adjacent the end of each car, said terminals of corresponding lines on adjacent ends of said cars being aligned with and abutting each other, at least one locking member supported on said other car and projecting into said socket and detachably engaging the shoulder on said coupling pin whereby to prevent withdrawal of the pin from the socket, means for shifting said locking member longitudinally within said socket into a tight locked engagement with said coupling pin, said locking member thereby drawing said coupling pin deeper into said socket, the terminals of corresponding service lines on said cars when said coupling pin is drawn into said socket likewise being drawn together into tight engagement with each other, the terminals of said service lines having valves normally closing said lines, and means responsive to said shifting of the locking member for simultaneously actuating said valves whereby said valves are opened only when said coupling pin is tightly locked.

11. In apparatus for coupling two railway cars in a train, one of said cars having extensible and retractible dolly wheels adjacent the coupled ends of the car, means for extending and retracting said dolly wheels, a coupler on one end of one car and a corresponding coupler on the adjacent end of another car, said couplers having means for tractively coupling the cars together and for supporting the adjacent end of the car having the dolly wheels adjacent the coupler, means for locking said couplers together, and means operatively connected to said means for extending and retracting said dolly wheels for actuating said locking means to lock said couplers together when said dolly wheels are retracted.

References Cited in the file of this patent
UNITED STATES PATENTS

| | | |
|---|---|---|
| 538,533 | Munson | Apr. 30, 1895 |
| 811,329 | Rooney | Jan. 30, 1906 |
| 1,161,426 | Van Dorn | Nov. 23, 1915 |
| 1,250,457 | Hild | Dec. 18, 1917 |
| 1,319,311 | Tomlinson | Oct. 21, 1919 |
| 1,394,057 | Woernley | Oct. 18, 1921 |
| 1,540,936 | Garankin | June 9, 1925 |
| 1,891,660 | Tomlinson | Dec. 20, 1930 |
| 2,114,720 | McKeige | Apr. 19, 1938 |
| 2,263,578 | Hickman | Nov. 25, 1941 |
| 2,596,778 | Lockhart | May 13, 1952 |

FOREIGN PATENTS

| | | |
|---|---|---|
| 953,052 | France | Nov. 30, 1949 |

OTHER REFERENCES

American Car and Foundry Co. publication, Wheels, for May-June 1949, illustration on p. 21. Published by American Car and Foundry Co. Copy in Division 34, U. S. Patent Office, class 105, subclass 4.